May 2, 1961  G. C. WEST  2,982,310
MOLDED DIAPHRAGM OF NON-WOVEN MATERIAL
Filed May 27, 1958

INVENTOR
GEORGE C. WEST
BY
Burgess, Ryan, & Hicks
ATTORNEYS

2,982,310
MOLDED DIAPHRAGM OF NON-WOVEN MATERIAL

George C. West, Chatham, N.J., assignor to Reeves Brothers, Inc., New York, N.Y., a corporation of New York Filed May 27, 1958, Ser. No. 738,181

3 Claims. (Cl. 137—793)

The present invention relates to a molded diaphragm formed from non-woven material and relates, more particularly, to a molded diaphragm suitable for use in gas meters or the like which is formed from a rubber compound containing non-woven fibers.

An object of the present invention is to provide a diaphragm which is satisfactory for use in a gas meter or the like and which has improved dimensional stability and flexibility. A further object of the present invention is to provide a diaphragm which has greater flexibility than diaphragms of treated leather or synthetic elastomers supported by fabric and which has greater dimensional stability than diaphragms made of unsupported synthetic elastomers such as are currently being used in gas meters.

Another object of the present invention is to provide a diaphragm having a high degree of dimensional stability and flexibility which can be readily molded to a desired configuration.

Figure 1:
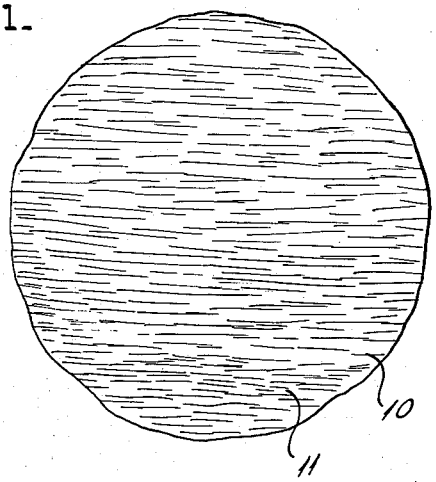
Figure 2:
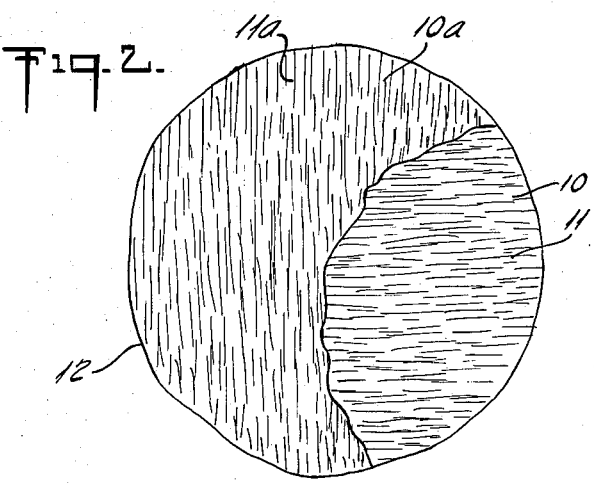
Figure 3:
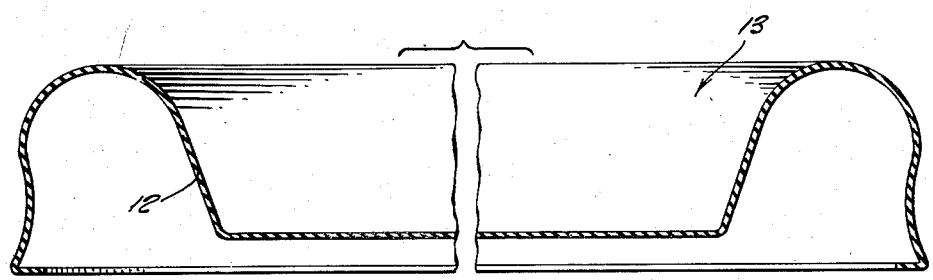

Other objects and advantages of the invention will be apparent and best understood from the following description and the accompanying drawing in which:

Fig. 1 diagrammatically illustrates a portion of a non-woven sheet formed of a rubber compound and random fibers for use in manufacture of a diaphragm made in accordance with the present invention;

Fig. 2 diagrammatically illustrates two of the non-woven sheets shown in Fig. 1 which have been laminated for use in a diaphragm made in accordance with the invention; and Fig. 3 is an elevation view in vertical section of a molded diaphragm made from the laminated sheets shown in Fig. 2.

Referring to the drawing in detail, there is a non-woven sheet 10, as shown in Fig. 1, which is formed from a rubber composition containing relatively short and discrete lengths of cut fibers 11 of natural or synthetic materials, such as rayon, nylon, cotton, which are distributed at random throughout the sheet.

The fibers 11 are cut into relatively short lengths and are incorporated in the synthetic rubber stock at the time of milling. An example of a suitable composition from which the sheet 10 may be formed is as follows:

| | Parts by weight |
|---|---|
| Buna N | 100.0 |
| Zinc oxide | 5.0 |
| Sulphur | 1.5 |
| Carbon black | 40.5 |
| Plasticizer | 25.0 |
| Dacron fiber | 10.0 |
| Altax | 1.0 |

It will be understood that the above formulation may be varied to obtain different properties. For example, an increase in the percentage of the fibers will increase the Shore hardness of the sheet, reduce the percent elongation and reduce the flexibility. Conversely, reduction of the fibers will produce the opposite effects.

After milling, the composition is passed through a calender and sheeted to a thickness or gauge of about 0.01 of an inch or other desired thickness. While the relatively short fibers 11 are distributed at random relative to each other and in non-contiguous relation across the sheet or layer, the calendering operations result in the fibers being generally oriented in a lengthwise direction with respect to the sheet or layer.

The incorporation of short lengths of random fibers in the sheet increases the strength and the resistance of the sheet to stretching or tearing in the direction in which the fibers are oriented, but there is little, if any, increase in the strength or the resistance to stretch in a direction perpendicular to the length of the fibers. Hence, the directional orientation of the fibers in the sheet results in the sheet having greater stretch and less tensile strength in one direction (at right angles to the lengths of the fibers) than it has in the other direction. To overcome this effect, two layers of the sheet material are laminated with the lengthwise or oriented direction of the fibers in the respective sheets being offset angularly with respect to each other.

As shown in Fig. 2, the sheet 10 with fibers 11 is laminated with a second sheet 10a of the same construction having non-woven random fibers 11a incorporated therein in such a way that the lengthwise or oriented directions of the fibers in the respective sheets are displaced angularly with respect to each other. In Fig. 2, the sheets 10 and 10a are displaced by 90 degrees.

The laminated sheets are then joined together by a suitable process such as vulcanizing or the like and thus, form an integral sheet 12 containing short lengths of fibers which has the same stretch and tensile strength in all directions and thus, has high dimensional stability while retaining a flexibility which approaches that of an unsupported sheet of a rubber compound. It will be understood that more than two layers or sheets may be laminated if desired and that the angle or offset between the direction of the fibers in the respective sheets may be varied.

The laminated sheet 12 may be readily molded into a diaphragm of the desired shape and contour in the usual manner. An example of a molded diaphragm 13 formed from the laminated non-woven sheet 12 (as shown in Fig. 2) is illustrated in Fig. 3. Diaphragms may be molded with ease from such laminated sheet material as it will allow deep draws to be made in the molds without wrinkling and tearing sheet material as would be the case with fabric supported elastomers. In addition, the laminated sheet will flow readily during the molding and can be molded with the same ease as a normal rubber compound so that it is possible to produce heavy or thin sections conforming to mold divisions and to produce a diaphragm having the same physical properties as one made from a fabric supported material.

Further, diaphragms made of elastomers incorporating non-woven fibers provide a dimensional stability which prevents changes in "proof" due to swelling or chemical action of the gas components on the elastomers. Flexibility of the diaphragm is also improved and since the individual fibers are surrounded by the rubber compound, there are no adhesion or wicking problems.

It will be understood that various changes and modifications may be made in the embodiment of the invention described and illustrated herein without departing from the scope of the invention as defined by the claims appended hereto.

I claim:

1. A molded diaphragm of a type suitable for a gas meter which comprises a sheet formed from at least two layers, each of said layers comprising a synthetic rubber compound and short lengths of cut fibers embedded in said compound, said fibers extending in a lengthwise direction in each of the layers and being distributed at random in non-contiguous relation across each of the layers, said layers being molded together with the fibers in one layer extending in angular relation to the fibers in the other layer.

2. A molded diaphragm suitable for use in a gas meter which comprises two layers of a synthetic rubber compound each of which incorporates a plurality of short lengths of cut fibers therein, said fibers being distributed across each layer in non-contiguous relation and generally extending in a lengthwise direction in each layer whereby said layers have greater elasticity in their width than in their length, said layers being integrally joined together with the fibers in one layer extending at an angle with respect to the fibers in the other layer.

3. A molded diaphragm as defined in claim 2 wherein the fibers in one layer extend generally at right angles to the fibers in the other layer.

References Cited in the file of this patent
UNITED STATES PATENTS

| | | |
|---|---|---|
| 1,515,702 | Reybold | Nov. 18, 1924 |
| 1,516,630 | Coberly | Nov. 25, 1924 |
| 1,771,749 | Eisenhardt | July 29, 1930 |
| 1,790,206 | Farmer | Jan. 27, 1931 |
| 2,033,354 | Pennington | Mar. 10, 1936 |
| 2,178,953 | Chilton | Nov. 7, 1939 |
| 2,483,406 | Francis | Oct. 4, 1949 |
| 2,578,534 | Giles et al. | Dec. 11, 1951 |